United States Patent
Ikeda et al.

(10) Patent No.: US 11,299,092 B2
(45) Date of Patent: Apr. 12, 2022

(54) INDOOR ILLUMINATION LAMP

(71) Applicant: YAZAKI CORPORATION, Tokyo (JP)

(72) Inventors: Takayuki Ikeda, Shizuoka (JP); Ken Suzuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 72 days.

(21) Appl. No.: 16/001,314

(22) Filed: Jun. 6, 2018

(65) Prior Publication Data

US 2018/0361922 A1 Dec. 20, 2018

(30) Foreign Application Priority Data

Jun. 15, 2017 (JP) .............................. JP2017-117472

(51) Int. Cl.

| | | |
|---|---|---|
| *F21V 5/00* | (2018.01) | |
| *B60Q 3/60* | (2017.01) | |
| *B60Q 3/51* | (2017.01) | |
| *B60Q 3/74* | (2017.01) | |
| *B60Q 3/76* | (2017.01) | |
| *B60Q 3/64* | (2017.01) | |
| *F21W 106/00* | (2018.01) | |
| *F21V 7/05* | (2006.01) | |
| *F21V 7/00* | (2006.01) | |
| *B60Q 3/82* | (2017.01) | |

(52) U.S. Cl.
CPC .................. *B60Q 3/60* (2017.02); *B60Q 3/51* (2017.02); *B60Q 3/64* (2017.02); *B60Q 3/74* (2017.02); *B60Q 3/76* (2017.02); *B60Q 3/82* (2017.02); *F21V 7/0025* (2013.01); *F21V 7/05* (2013.01); *F21W 2106/00* (2018.01)

(58) Field of Classification Search
CPC ..... B60Q 3/60; B60Q 3/74; B60Q 3/51; F21V 7/0025; F21V 7/05; F21W 2106/00
USPC ........................................................... 362/246
See application file for complete search history.

(56) References Cited

U.S. PATENT DOCUMENTS

| | | | |
|---|---|---|---|
| 2003/0007357 A1 | 1/2003 | Veldman | |
| 2005/0201098 A1* | 9/2005 | DiPenti | F21S 8/02 362/294 |
| 2007/0189027 A1* | 8/2007 | Sakakibara | B60R 7/04 362/490 |

(Continued)

FOREIGN PATENT DOCUMENTS

| | | |
|---|---|---|
| JP | 2007-066630 A | 3/2007 |
| JP | 2009067098 A | 4/2009 |

(Continued)

OTHER PUBLICATIONS

Notice of Reasons for Refusal dated Mar. 26, 2019 from the Japanese Patent Office in application No. 2017-117472.

*Primary Examiner* — Omar Rojas Cadima
(74) *Attorney, Agent, or Firm* — Sughrue Mion, PLLC

(57) ABSTRACT

An indoor illumination lamp includes a housing to be attached to an interior ceiling of a vehicle and provided with an opening, an interior light lens arranged at the opening of the housing, a chamber provided in the housing and surrounding the opening where the interior light lens is arranged, a light emitting diode arranged at a corner of the chamber and capable of emitting light toward the interior light lens, and a reflector arranged on an inner face in the chamber.

6 Claims, 5 Drawing Sheets

(56) References Cited

U.S. PATENT DOCUMENTS

2010/0188838 A1 7/2010 Jun et al.
2013/0003352 A1 1/2013 Lee et al.

FOREIGN PATENT DOCUMENTS

| JP | 4831097 B2 | 12/2011 |
| JP | 2014094656 A | 5/2014 |
| JP | 2016115682 A | 6/2016 |

* cited by examiner

INDOOR ILLUMINATION LAMP

BACKGROUND

Technical Field

The present application relates to an indoor illumination lamp to be attached to an interior ceiling of a vehicle.

Related Art

Various indoor illumination lamps to be attached to an interior ceiling of a vehicle have been proposed (see JP 2007-066630 A and JP 4831097 B). A conventional example of such an indoor illumination lamp includes a housing to be attached to an interior ceiling of a vehicle, a switch knob provided on a lower face side of the housing, a lens provided on the lower face side of the housing, and a light emitting diode arranged in the housing.

Irradiation light from the light emitting diode causes the lens to emit light, and the vehicle interior is irradiated with the light.

In a case where the lens is an interior light lens, it is necessary to cause the entire area of the lens to emit light as evenly as possible. Therefore, a plurality of light emitting diodes is arranged, or a light guide plate is integrally arranged inside the interior light lens.

SUMMARY

However, the cost is increased in a case where a plurality of light emitting diodes is arranged, and the structure becomes complicated in a case where a light guide plate is integrally provided inside the lens. It is therefore required to cause the entire area of the lens to emit light as evenly as possible without arranging a plurality of light emitting diodes, that is, increasing the light emission volume of light emitting diodes, and without integrally arranging a light guide plate on the inner side of the lens.

Consequently, the present application has been made with the aim of solving the above problem, and an object of the present application is to provide an indoor illumination lamp, which can cause the entire area of the lens to emit light as evenly as possible without increasing the light emission volume of the light source and without using a light guide plate.

An indoor illumination lamp according to an aspect of the present application includes a housing to be attached to an interior ceiling of a vehicle and provided with an opening, a lens arranged at the opening of the housing, a chamber provided in the housing and surrounding the opening where the lens is arranged, a light emitting diode arranged at a corner of the chamber and capable of emitting light toward the lens, and a reflector arranged on an inner face in the chamber.

With the indoor illumination lamp according to the aspect of the present application, it is possible to cause the entire area of the lens to emit light as evenly as possible without increasing the light emission volume of the light source and without using a light guide plate.

DETAILED DESCRIPTION

Figure 1:
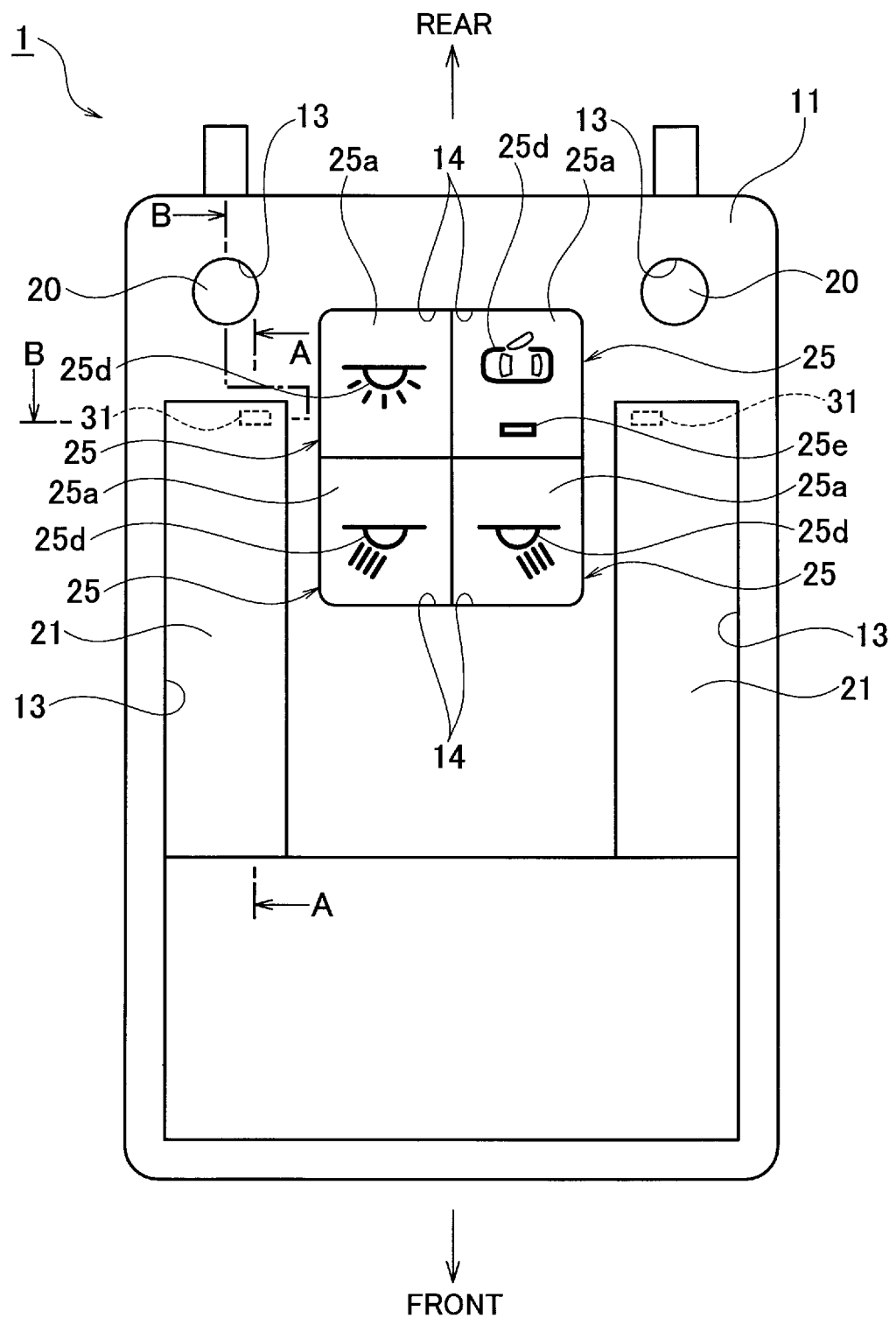
FIG. 1 is a view of an indoor illumination lamp (map lamp) according to an embodiment obtained when looking up an interior ceiling from a vehicle interior.

A following description will explain an embodiment with reference to the drawings.

FIGS. 1 to 5 illustrate an indoor illumination lamp according to an embodiment.

A map lamp 1, which is an indoor illumination lamp according to an embodiment, is attached to an interior ceiling 2 at a position in front of a front seat of a vehicle.

The map lamp 1 includes a housing 10 attached to the interior ceiling 2, a pair of right and left spotlight lenses 20 and a pair of right and left interior light lenses 21, which are arranged on a lower face side of the housing 10, a plurality of switch knobs 25 arranged on the lower face side of the housing 10, and a substrate 30 arranged in the housing 10.

The housing 10 is formed of a member which does not transmit light. The housing 10 includes a housing body 11, and a ceiling side housing part 12 assembled with the housing body 11 and covering a ceiling side of the housing body 11. The housing body 11 includes a plurality of light-shielding partition walls 11a. A plurality of openings 13, 14 is formed on the lower face side of the housing body 11 so that respective spaces partitioned by the plurality of light-shielding partition walls 11a are opened.

The ceiling side housing part 12 is provided with an attachment part (not illustrated) to be attached to the interior ceiling 2.

The spotlight lenses 20 and the interior light lenses 21 are arranged to cover the respective openings 13. Each of the spotlight lenses 20 has a face exposed to the vehicle interior, the face having a small circular shape. Each of the interior light lenses 21 has a face exposed to the vehicle interior, the face having a large square shape.

Each of the switch knobs 25 is arranged to cover a corresponding opening 14 on the lower face side of the housing body 11. Each of the switch knobs 25 is of push type. Each of the switch knobs 25 excluding a logo part 25d is formed of a member which does not transmit light. Each of the switch knobs 25 includes an operation part 25a exposed to the surface of the housing body 11; a switch depression rod (not illustrated) protruded in the housing body 11; and a light-shielding wall (not illustrated) protruded in the housing body 11.

Each operation part 25a includes the logo part 25d formed of a member which transmits light. The logo part 25d has a mark shape with which a function allocated to the switch knob 25 can be recognized visually. To the operation part 25a of one switch knob 25, an indicator lens 25e is attached in addition to the logo part 25d.

The substrate 30 is in contact with an upper face side of each of the light-shielding partition walls 11a of the housing body 11. The substrate 30 closes a ceiling side of the plurality of openings formed by partitioning with the light-shielding partition walls 11a (see FIG. 3). That is, irradiation light from three-color light emitting diodes 31 is kept from leaking toward the ceiling side housing part 12. On the substrate 30, the plurality of three-color light emitting diodes 31, a plurality of switching elements SW, and the like are mounted. Each of the three-color light emitting diodes 31 is arranged in each of areas, which are partitioned by the light-shielding partition walls 11a and correspond to the respective spotlight lenses 20, interior light lenses 21, and the respective switch knobs 25. Regarding a switch knob 25 having the indicator lens 25e, each three-color light emitting diode 31 is arranged not only at the logo part 25d but also in an area corresponding to the indicator lens 25e.

Each three-color light emitting diode 31 incorporates a red (R) light emitting element, a green (G) light emitting element, and a blue (B) light emitting element, and can emit light of a predetermined color according to a current value, for example.

Each switching element SW is arranged at a position right below a switch depression rod (not illustrated) of each switch knob 25.

Figure 2:
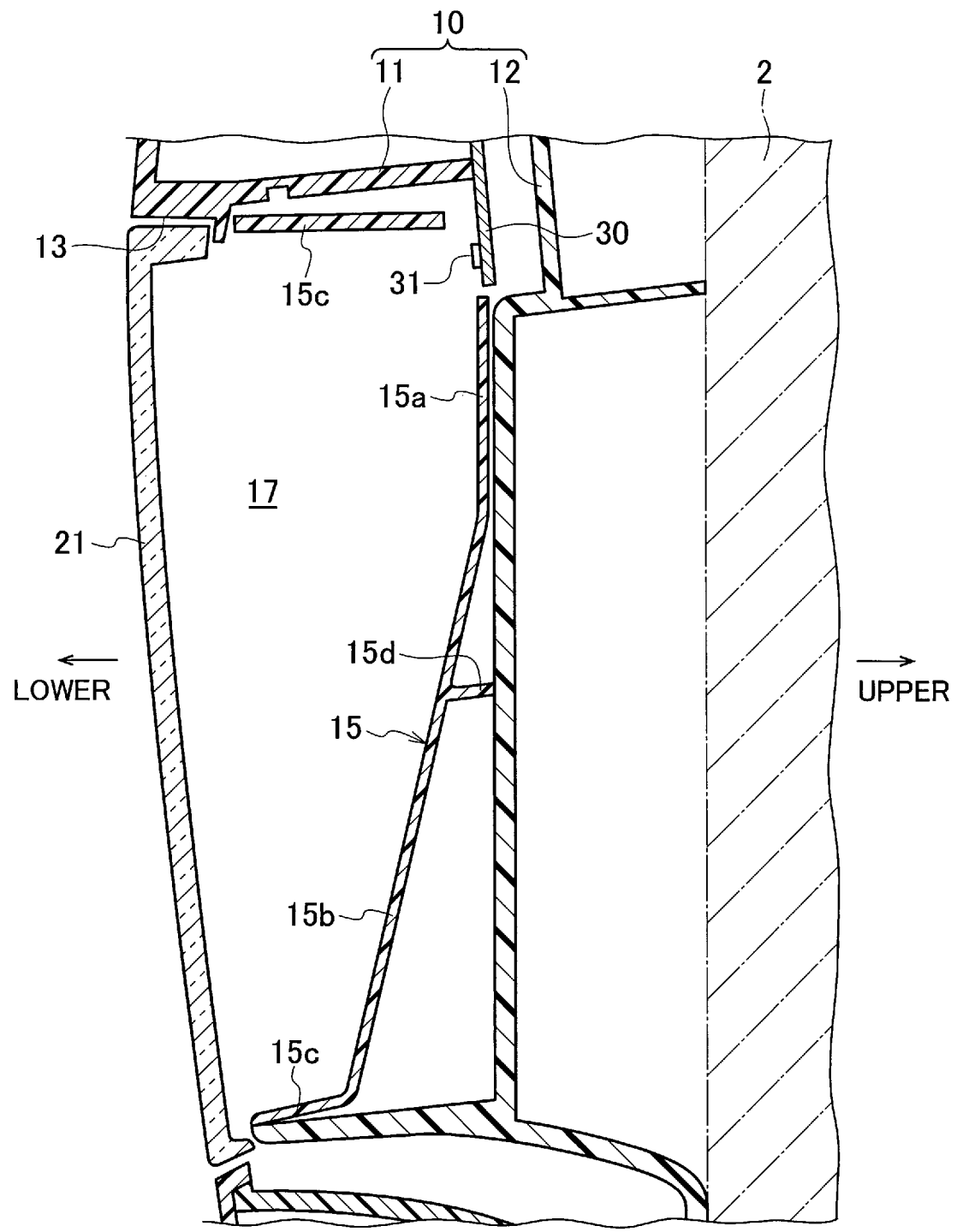
FIG. 2 is a sectional view along line A-A in FIG. 1.
Figure 3:
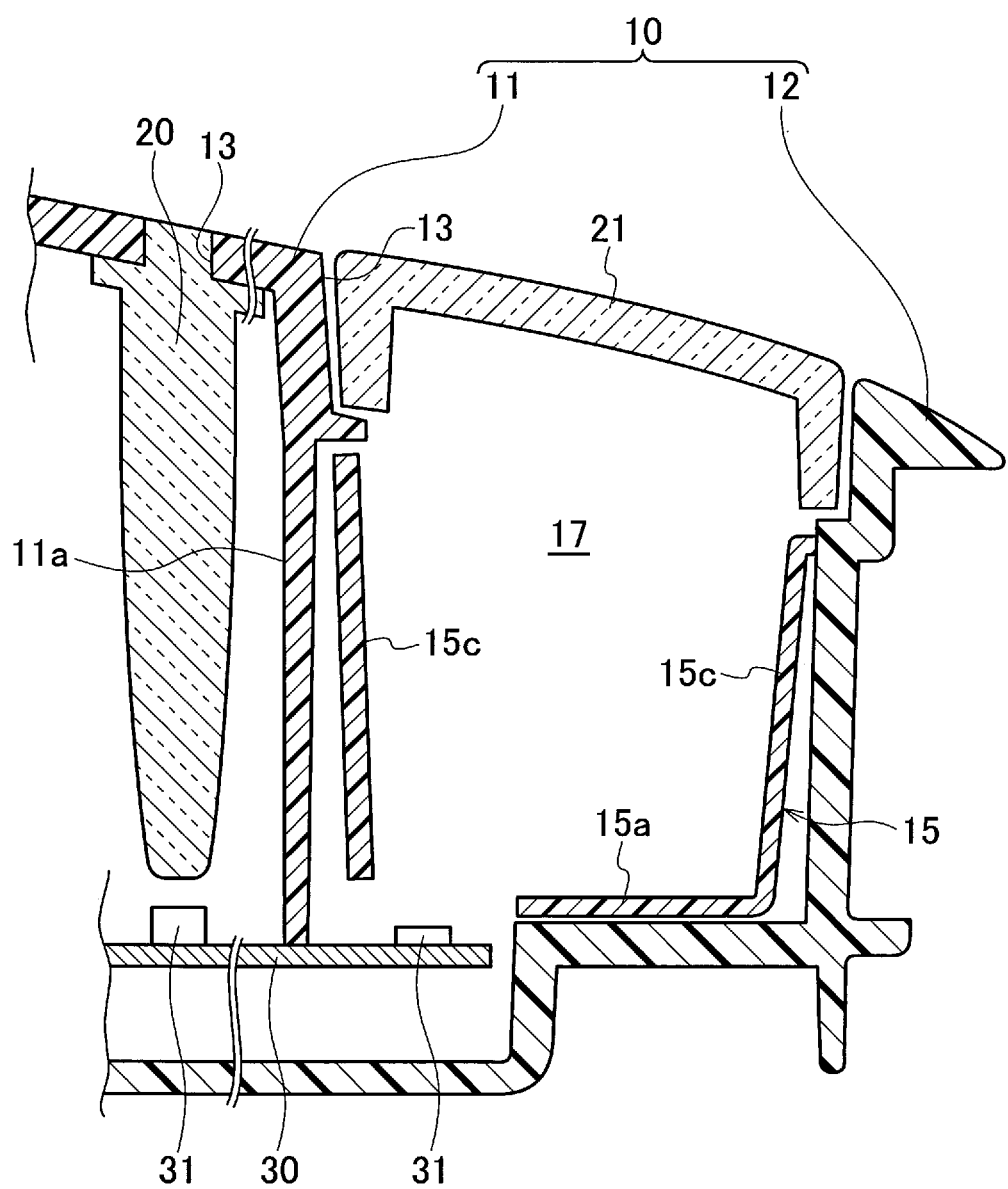
FIG. 3 is a sectional view along line B-B in FIG. 1.
Figure 4:
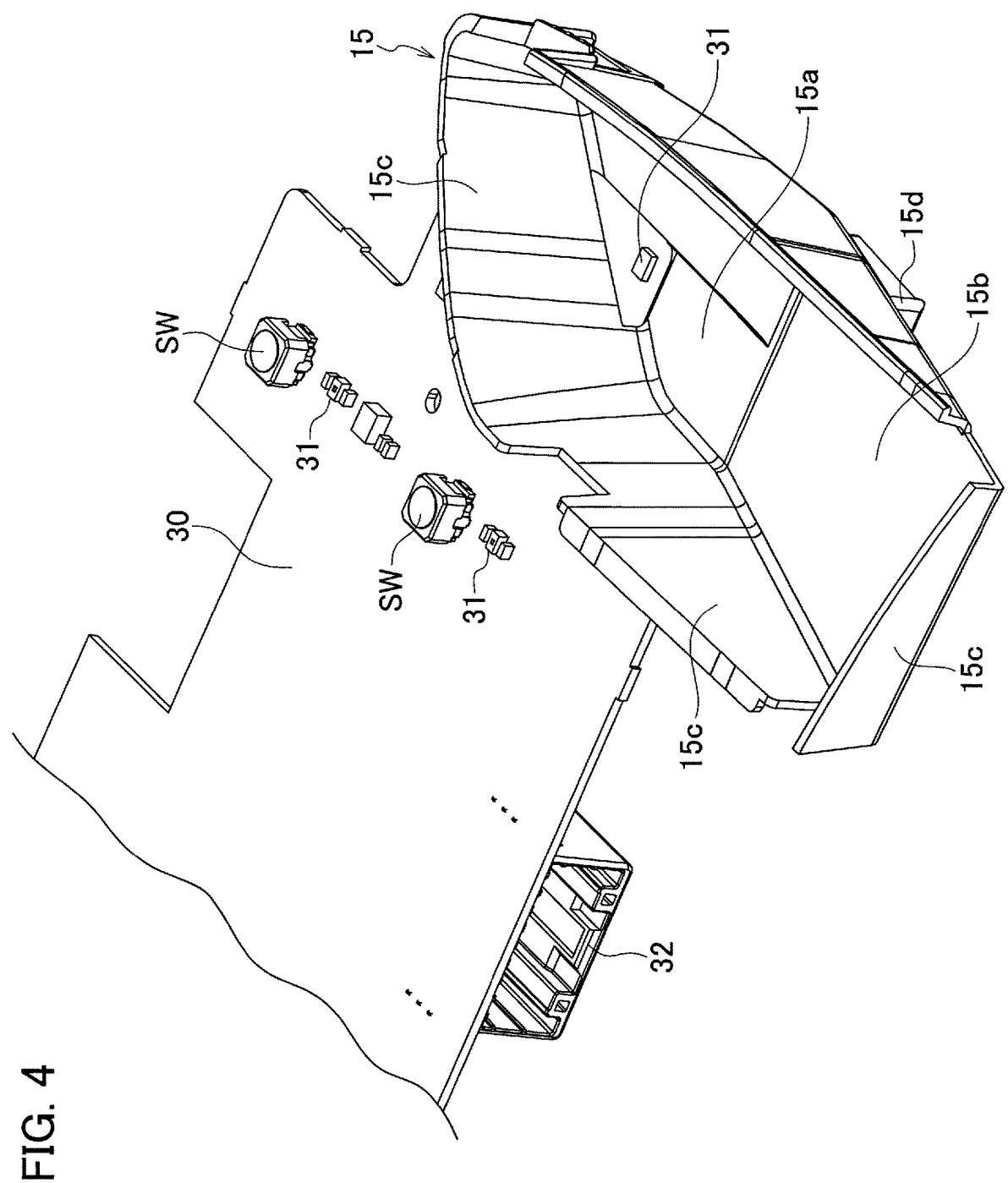
FIG. 4 is a perspective view obtained when looking at an inner face side of a reflector of the indoor illumination lamp according to the embodiment.

Next, an area where each of the interior light lenses 21 is caused to emit light will be described. As illustrated in FIGS. 2 and 3, chambers 17, each of which surrounds each of openings 13 where a corresponding interior light lens 21 is arranged, are provided in the housing 10. A three-color light emitting diode 31 is arranged at a corner of each of the chambers 17. A reflector 15 is arranged at each of the chambers 17. The reflector 15 has a shape illustrated in FIGS. 4 and 5, and is arranged over the entire inner face of the chamber 17. In particular, the reflector 15 includes a flat face part 15a arranged along a ceiling face of a corresponding chamber 17, an inclined face part 15b arranged on the ceiling face of the corresponding chamber 17, and a side face part 15c arranged along an entire side face of the corresponding chamber 17. The flat face part 15a is parallel to the plane of a corresponding interior light lens 21 and is arranged in an area of the ceiling face close to a corresponding three-color light emitting diode 31. The inclined face part 15b is inclined with respect to the corresponding interior light lens 21 (inclined to a direction such that the inclined face part 15b faces the corresponding three-color light emitting diode 31) and is arranged in an area of the ceiling face far from the corresponding three-color light emitting diode 31.

Figure 5:
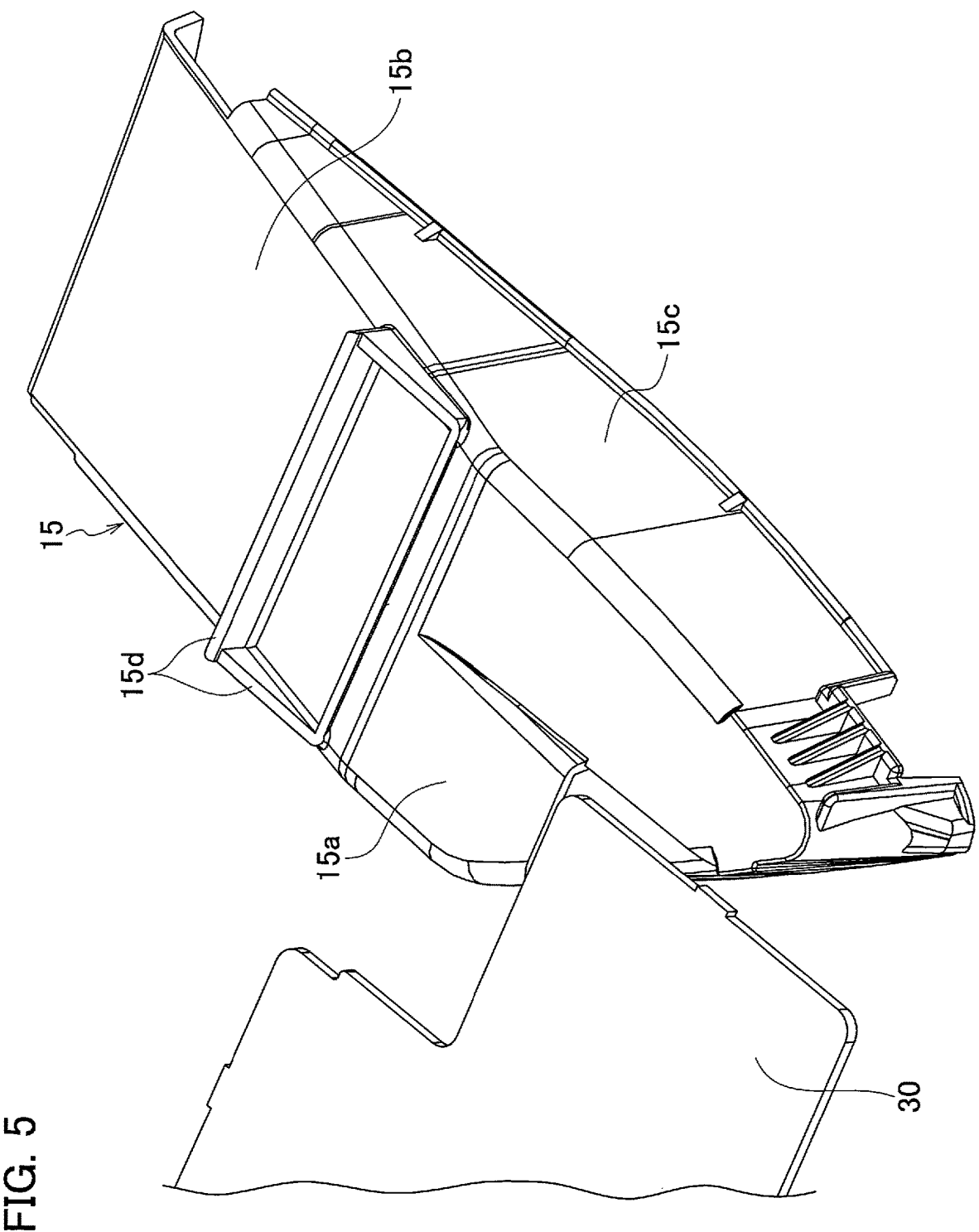
FIG. 5 is a perspective view obtained when looking at an outer face side of the reflector of the indoor illumination lamp according to the embodiment.

The reflector 15 is provided with a surrounding rib 15d on an outer face of the inclined face part 15b (particularly see FIG. 5). Inclination of the inclined face part 15b causes the surrounding rib 15d to capture falling dust or the like and makes it possible to prevent the falling dust or the like from falling downward.

As described above, the map lamp (indoor illumination lamp) 1 according to the embodiment includes the housing 10 to be attached to the interior ceiling 2 of a vehicle and provided with the openings 13, the interior light lenses 21 each arranged at a corresponding opening 13 of the housing 10, chambers 17 provided in the housing 10 and each surrounding a corresponding opening 13 where a corresponding interior light lens 21 is arranged, the three-color light emitting diodes 31 each arranged at a corner of a corresponding chamber 17 and capable of emitting light toward a corresponding interior light lens 21, and the reflectors 15 each arranged on an inner face in a corresponding chamber 17.

Since each of the interior light lenses 21 is irradiated directly with light emitted from a corresponding three-color light emitting diode 31 and is also irradiated with light reflected once or a plurality of times by a corresponding reflector 15, it is possible to cause the entire area of the corresponding interior light lens 21 to emit light as evenly as possible. Accordingly, with the map lamp 1 according to the embodiment, it is possible to cause the entire area of each of the interior light lenses 21 to emit light as evenly as possible without increasing the light emission volume of the corresponding three-color light emitting diodes 31, which are the light source, and without using a light guide plate.

Each of the reflectors 15 in the map lamp 1 according to the embodiment is formed at the flat face part 15a parallel to the plane of the corresponding interior light lens 21, in the area of the ceiling face close to the corresponding three-color light emitting diode 31, and at the inclined face part 15b inclined with respect to the plane of the corresponding interior light lens 21 (inclined to the direction such that the inclined face part 15b faces the corresponding three-color light emitting diode 31), in the area of the ceiling face far from the three-color light emitting diode 31.

Accordingly, the area of the corresponding interior light lens 21 far from the corresponding three-color light emitting diode 31 is irradiated with light reflected at the inclined face part 15b, and this contributes to cause the entire area of the corresponding interior light lens 21 to emit light as evenly as possible.

In the map lamp 1 according to the embodiment, each of the reflectors 15 is arranged over the entire inner face of the corresponding chamber 17. Accordingly, since any position of the inner face of the corresponding chamber 17 is irradiated with reflected light, the efficiency of irradiation of the corresponding interior light lens 21 with light emitted from the corresponding three-color light emitting diode 31 becomes high, and this contributes to bright light emission from the corresponding interior light lens 21.

In the map lamp 1 according to the embodiment, each of the reflectors 15 includes the surrounding rib 15d on the outer face of the inclined face part 15b. Accordingly, it is possible to prevent dust or the like from entering into an inner face side of the corresponding interior light lens 21 as much as possible. That is, the ceiling side housing part 12 is provided with an opening (not illustrated) such as an insertion slot for a vehicle side connector (not illustrated) to be connected with a connector 32 of the substrate 30. Although dust or the like may possibly enter into the housing 10 from such an opening of the ceiling side housing part 12, dust or the like, which has entered into the housing 10, is captured by the surrounding rib 15d, and it is possible to prevent the dust or the like from falling downward.

What is claimed is:

1. An indoor illumination lamp, comprising:
  a housing attached to an interior ceiling of a vehicle and provided with an opening;
  a lens arranged at the opening of the housing;
  a chamber provided in the housing and surrounding the opening where the lens is arranged;
  a light emitting diode arranged at a corner of the chamber so as to face the lens and configured to directly emit light toward the lens; and
  a reflector, independent of, and spaced apart from the housing, and arranged and fixed on an inner face in the chamber, the reflector configured to introduce light emitted to the reflector from the light emitting diode toward the lens.

2. The indoor illumination lamp according to claim 1, wherein the reflector comprises a flat face part parallel to a plane of the lens, in an area of a ceiling face close to the light emitting diode, and an inclined face part inclined with respect to the plane of the lens, in an area of the ceiling face far from the light emitting diode.

3. The indoor illumination lamp according to claim 1, wherein the reflector is arranged over an entire inner face of the chamber.

4. The indoor illumination lamp according to claim 2, wherein
   the reflector is arranged over an entire inner face of the chamber.
5. The indoor illumination lamp according to claim 2, wherein
   the reflector comprises a surrounding rib on an outer face of the inclined face part.
6. The indoor illumination lamp according to claim 1, wherein
   the light emitting diode is offset from a center of the chamber.

\* \* \* \* \*